United States Patent [19]

Geary

[11] Patent Number: 5,015,017
[45] Date of Patent: May 14, 1991

[54] THREADED TUBULAR COUPLING

[76] Inventor: George B. Geary, 955 E. Bunker Hill, Houston, Tex. 77024

[21] Appl. No.: 223,678

[22] Filed: Jul. 25, 1988

Related U.S. Application Data

[63] Continuation of Ser. No. 28,189, Mar. 19, 1987, abandoned.

[51] Int. Cl.[5] .............................................. F16L 25/00
[52] U.S. Cl. ................................... 285/333; 285/383; 285/390
[58] Field of Search ................ 285/334, 333, 383, 390

[56] References Cited

U.S. PATENT DOCUMENTS

| | | | |
|---|---|---|---|
| 2,054,118 | 9/1936 | Childs et al. | 285/333 X |
| 2,122,757 | 7/1938 | Scott | 285/383 X |
| 2,161,568 | 6/1939 | Gignoux | 285/383 X |
| 2,918,315 | 12/1959 | Peter et al. | 285/333 X |
| 4,384,737 | 5/1983 | Reusser | 285/334 |
| 4,538,840 | 9/1985 | DeLange | 285/383 X |
| 4,550,937 | 11/1985 | Duret | 285/383 X |
| 4,600,219 | 7/1986 | Yoshida et al. | 285/383 X |

FOREIGN PATENT DOCUMENTS

| | | | |
|---|---|---|---|
| 871991 | 5/1942 | France | 285/333 |
| 86/02137 | 4/1986 | World Int. Prop. O. | 285/334 |

*Primary Examiner*—Dave W. Arola
*Attorney, Agent, or Firm*—Arnold, White & Durkee

[57] ABSTRACT

Threaded oil well pipe joint comprising a coupling having internally threaded ends and an intermediate unthreaded area with substantially greater cross section area. The internally threaded ends are made up with externally threaded ends of pipe. Stresses resulting from joining either end of the coupling to a pipe section are absorbed by the intermediate area so that such stresses will not affect the opposing end of the coupling. Because the stresses during makeup of one end do not affect the other end of the coupling, the overall stress levels, pootential for thread damage and leakage are reduced in the joint. As a result, the outside diameter of the coupling may be significantly reduced so that the joint can be run more easily in a restricted diameter well bore.

9 Claims, 1 Drawing Sheet

THREADED TUBULAR COUPLING

This is a continuation of co-pending application Ser. No. 028,189 filed on Mar. 19, 1987 and now abandoned.

BACKGROUND OF THE INVENTION

1. Field of the Invention

The present invention relates generally to threaded couplings and more specifically to leak resistant threaded couplings for oilwell casing, tubing and line pipe.

2. Description of the Related Art

Presently the standard method of joining lengths of oil well casing, tubing and line pipe is by means of a threaded and coupled connection. The coupling is generally a short tubular hollow piece usually of the same material as the pipe and about ½ inch to 1 inch larger in outer diameter than the pipe. The typical oil well coupling is threaded on its inside diameter. Generally the coupling is threaded so that the connection may be uncoupled by unscrewing the pipe from one or both ends of the coupling. The coupling is internally threaded and is the female member while the outside of the pipe is externally threaded and is the male member of the joint.

It is desirable in connecting together lengths of oil well pipe that the coupling satisfy several functions. One of these functions is to provide leak resistance from internal or external pressure. It is also desirable that the coupling have the capability to resist tension and thereby prevent the connection from pulling apart. Additionally, the coupling preferably should have resistance to torsion in order to keep the pieces of pipe from rotating further into or out of the coupling. Additionally, a coupling preferably should have structural rigidity to avoid yielding under bending tension or compression stresses or any combination thereof.

In the past, a number of different devices have addressed the problem of leak resistance in threaded and coupled oil well connections. The present invention is a coupling that provides leak resistance in a manner different than any of the prior art.

Generally a threaded and coupled connection includes a pin thread which is cut on the outside diameter of each end of a length of oil well pipe. The mating coupling is threaded on the inside diameter for both ends of the coupling. In the prior art the inside threads of the coupling meet or overlap in the center of the coupling. The threads in the center of the coupling are deemed imperfect and thus are not intended to engage the mating pin threads on the pipe section. Generally, a gap of ½ inch to 1 inch remains between the two sections of pipe after makeup within the coupling.

In the oil industry, it is common to screw a coupling onto one end of each length of pipe at the point of manufacture. The present invention seeks to analyze the coupling from the point of view of its initial installation onto the piece of pipe at the threading plant. At the threading plant, the coupling is gripped on its outside surface and then screwed onto the mating pin end of the pipe section. This gripping action on the outside of the coupling results in compressive and torsional stresses in the coupling. The result is that a portion of these stresses is transferred to the pin member and may cause yielding due to compressive and torsional loading during makeup. A serious problem with these stresses is damage in the form of thread galling or permanent deformation of the threads.

When the first end of a coupling is made up with a section of pipe, hoop stresses are created in the coupling that are distributed throughout the full length of the coupling. The stress pattern that is created is positive on the made up side of the coupling and becomes negative or compressive on the open end of the coupling. When the end of the coupling is then made up with the second pin member, these negative or compressive stresses in the coupling become positive and tend to reduce the stresses on the first end of the coupling. In other words, during makeup of the second end of the coupling, the stresses generated at the second end during makeup tend to negatively impact the stresses which resulted from makeup of the first side of the coupling. As a result, the stresses in the coupling after final makeup of both ends are not uniformly distributed. Each side of the coupling will have different stress levels. Additionally, the stress at the center of the coupling will not be eliminated upon final makeup of the coupling.

The stress patterns that result in the coupling cause different leak resistance on either side of the coupling. The differential stresses would be minimized if both sides of the coupling were made up simultaneously or all of the machining was perfect on the coupling and pipe threads. However, neither simultaneous makeup nor perfect machining is possible or practical. The imperfect thread area in the center of a coupling is subject to additional high hoop stresses and expansion as a result of internal pressure. Resistance to expansion at that area of the coupling, therefore, is critical. The area of the coupling threads that is critical to preventing leakage is the portion directly adjacent to the lead threads of the ends of each pipe section.

SUMMARY OF THE INVENTION

The present invention addresses the above problems by increasing the cross section area at the center of the coupling. This center section is thickened and unthreaded. The inside diameter of the increased section is approximately equal to the inside diameter of the pipe sections. The increased section has a substantially greater mass than the threaded area. Thus the threaded areas on each side of the coupling function as opposing cantilever beams. The thickened section absorbs the radiating stresses from the thinner threaded areas on each side of the coupling. Therefore, by converting the mechanical behavior of a coupling from a simple beam to a cantilever beam, the performance of the coupling with respect to leak resistance is improved dramatically.

The increased cross section of the intermediate or center area of the coupling prevents expansion of the coupling under internal pressure, bending, and/or tension, and thereby maintains contact pressure between the mating threads and avoids leakage or thread jump-out.

A significant advantage, therefore, of the present invention, is improved leak resistance by adding to the cross section area of the intermediate portion of the coupling, thereby resisting expansion of the coupling due to internal pressure.

Another advantage of the present invention is that the increased section in the center of the coupling provides sufficient strength so that the outside diameter of the coupling may be narrowed down into a thinner diameter. By reducing the coupling's outside diameter, maximum diameter casing can be run in a given well bore without as great a risk of hanging up on the well bore.

DETAILED DESCRIPTION OF THE PREFERRED EMBODIMENT

Figure 1:
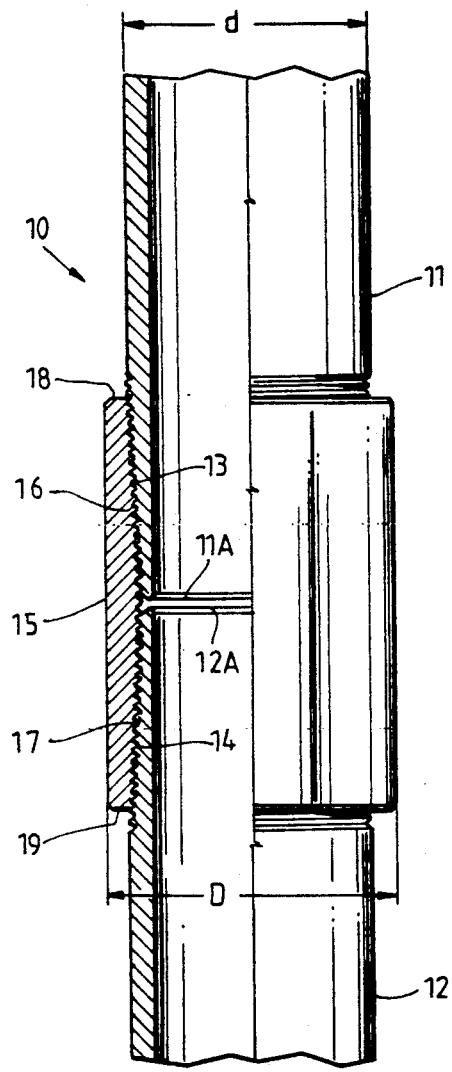
FIG. 1 is a side elevational view of a string of casing sections connected with a coupling in accordance with the prior art.

Referring now to the drawings and more specifically to FIG. 1 a casing string 10 and coupling according to the prior art is illustrated. The casing string 10 includes two casing sections 11 and 12, having pin ends 11A and 12A, interconnected with a coupling 15 according to the prior art.

Still referring to FIG. 1 and the prior art, the casing 10 includes pin threads 13 and 14 on each end thereof on the outside of the casing section, the threads mating with the threaded internal surface of the coupling 15. The coupling 15 includes a first end 18 and a second end 19. Interior of the first end 18 is a threaded internal surface 16. The second end 19 also has an internal threaded surface 17. The threads are preferably tapered API threads as are commonly used in this application; however, other thread forms may be used.

Figure 2:
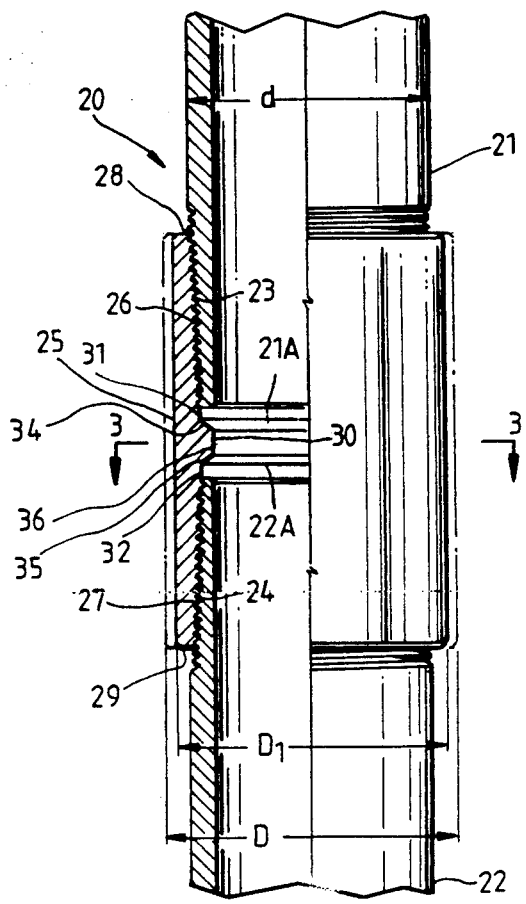
FIG. 2 is a side elevational view of a string of casing sections connected with a coupling in accordance with the present invention.

Now referring to FIG. 2, which shows an oil well pipe joint according to a preferred embodiment of the present invention, a casing string is illustrated generally at 20. The casing string 20 includes two casing sections 21 and 22 interconnected with coupling 25 according to the present invention. The casing sections include external pin threads 23 and 24 which mate with internal threads on the threaded areas 26 and 27 of the coupling. The coupling has a first end 28 and a second end 29.

Located between the ends 28 and 29 of the coupling 25 is an intermediate or center section 30 which is unthreaded. The center section 30 has been increased in section thickness. The center section 30 includes a first shoulder 34, a second shoulder 35, and an annular interior surface 36 therebetween. The inside diameter of the increased center section is approximately equal to the inside diameter of the pipe, but is preferably not less than the inside diameter of the pipe.

As shown in FIG. 2 the increased center section 30 has a substantially greater mass than the threaded areas 26 and 27. Because the intermediate or center section 30 has substantially greater mass, the threaded areas 26 and 27 on each side of the coupling function as cantilever beams. As two cantilever beams 26 and 27 in a tubular form, each opposing one another, the supporting end of the beam is the intermediate or center area 30 of the coupling. This cantilever beam function occurs due to the stresses from the thinner threaded areas 26 and 27 on each side of the coupling being absorbed by the heavier center section 30. By converting the mechanical behavior of a coupling from that of a simple beam to that of a cantilever beam, the coupling's performance and leak resistance is enhanced dramatically.

According to the present invention, the pipe threads and the coupling threads form thread seals between the pin threads 23 and 24 and the threaded areas 26 and 27 of the coupling. Preferably, the seals take place at the lead threads near the pin ends 21A and 22A of pipe sections 21 and 22. A tolerance or gap is left between each end 21A, 22A of the pipe sections and the shoulders 34 and 35.

One of the advantages of the present invention is absorption of hoop stresses during makeup. Another advantage is minimization of potential galling of the threads. Another advantage is reduced stress response reaction in the first pin section 21 when making up the second pin section 22 with the coupling. The result is a higher and more closely controlled contact pressure in the mating threads, and therefore improved leak resistance. Another feature of the present invention is the elimination of potential for overmakeup of the pin members with respect to the coupling.

By minimizing distortion during makeup, the couplings according to the present invention can be broken out with less galling than found in the prior art couplings. The present invention also minimizes potential for jumpout of the pin sections when the joint is under tension and bending stresses. Additionally, the present invention eliminates the need for metal to metal seal couplings, or other types of positive seal mechanisms, between the pipe sections and the coupling.

Accordingly, under the present invention, the increase in section area at the center or intermediate area 30 of the coupling will help prevent damaging stresses on one end of the thread during makeup of the opposing end of the coupling. This increased center section 30 will help absorb the stresses in both ends of the coupling so that one end of the coupling while being connected to an oil well pipe section will not affect the makeup and sealing characteristics of the other end of the coupling.

The increased area of the center or intermediate portion 30 of the coupling also helps to prevent potential leakage at the critical areas 31 and 32 of the coupling directly adjacent to the ends of the pipe. With the present invention, thread seals are maintained between the end threads near the pin ends 21A and 22A and the critical areas 31 and 32 of the coupling. That is, the intermediate area 30 has increased diameter where the joint is most critical to expansion and leakage. When internally pressurized, the coupling is more resistive to expansion and separation of the coupling threads from the pin member threads because of the increased cross-sectional area of the mid section. Thus, resistance to thread leakage is improved. Because of the improved leak resistance of the present invention, it is possible to reduce the outside circumference of the coupling by making it more flush with the outside diameter of the pipe section.

As can be seen in FIG. 1 and FIG. 2, the nominal diameter of the pipe is d. The outside diameter of the coupling according to the prior art is shown as D, as can be seen in FIG. 1. With the present invention, the outside diameter can be reduced from D to $D_1$, because the increased center section 30 has improved resistance to expansion and thread leakage at the critical areas 31 and 32, as shown in FIG. 2.

Figure 3:
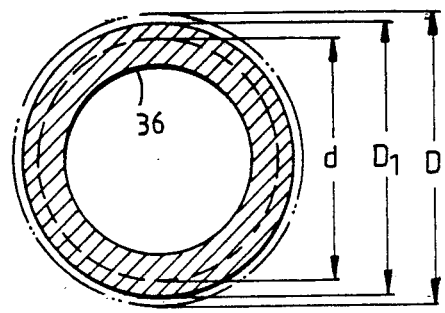
FIG. 3 is a cross sectional view taken at line 3—3 of the joint illustrated in FIG. 2.

The reduced diameter of the coupling according to the present invention also is shown in FIG. 3. The outside diameter d of the pipe section is shown, as well as the outside diameter D of the coupling according to the prior art and the outside diameter $D_1$, according to the present invention.

The present invention has been described and illustrated with respect to a specific embodiment. It will be understood to those skilled in the art that changes and modifications may be made without departing from the spirit and scope of the invention as set forth in the appended claims.

What is claimed is:

1. A tubular coupling for joining together externally API threaded ends of two pipes comprising:

opposing first and second internally API threaded end sections, the internally threaded end sections dimensioned to induce high contact pressure in the threads;

an unthreaded thickened and lengthened center section having first and second tapered internal shoulders joining the first and second end sections, the shoulders having a non-interlocking and non-sealing relationship with the pipe ends.

2. The tubular coupling of claim 1 wherein the coupling outside diameter is narrowed to facilitate running the coupling through a restricted diameter well bore.

3. The tubular coupling of claim 1 wherein the inside diameter of the thickened center section is substantially the same as the inside diameter of the pipe ends.

4. An oil well pipe coupling for joining sections of pipe without any positive seal mechanism, each pipe section including a pin member externally threaded with API standard threads, comprising:

opposing first and second box members, each box member including an internal tapered thread area beginning at one end of the member and terminating at a sloped internal shoulder, the thread area having API standard threads, the thread area dimensioned to induce hoop tension in the box members, the sloped internal shoulders being joined together to form an intermediate area, the sloped shoulders having a non-interlocking, non-sealing relationship with the pipe section.

5. The oil well pipe coupling of claim 4 having a narrowed outer body to facilitate running the coupling through a restricted diameter well bore.

6. The oil well pipe coupling of claim 4 wherein the inside diameter of the intermediate area is substantially the same as the inside diameter of the pipe section.

7. An improved API threaded pipe coupling having first and second threaded ends for repeatedly joining together standard API threaded pipe sections wherein the improvement comprises:

an unthreaded intermediate section axially spaced between the first and second threaded ends, the intermediate section having substantially the same internal diameter as the internal diameter of the pipe sections and being axially lengthened and having tapered internal shoulders in spaced relation with the pipe ends, the intermediate section functioning as the supporting end of a cantilever beam to resist radial expansion of the first and second ends.

8. An improved API threaded pipe coupling of the type for repeatedly joining together two externally threaded API pipe ends and inducing radial compressive stress in the pipe ends, wherein the improvement comprises:

a tubular coupling body having a substantially uniform outside diameter and having first and second internally threaded ends, dimensioned to induce radial compression of the pipe sections and radial tension in the first and second ends of the coupling body; and unthreaded center section longitudinally spaced between the first and second ends of the coupling body, the center section having an inner diameter substantially the same as the inner diameter of the threaded pipe sections and having tapered shoulders longitudinally spaced from the ends of the threaded pipe sections upon makeup of the joint, the center section having increased radial thickness over standard API threaded pipe.

9. An improved API threaded pipe coupling having first and second threaded ends for repeatedly joining together standard API threaded pipe sections wherein the improvement comprises:

an unthreaded intermediate section axially spaced between the first and second threaded ends, the intermediate section having tapered internal shoulders in spaced relation with the pipe ends, the intermediate section being thickened and lengthened to form the supporting end of a tubular cantilever beam, whereby said coupling induces high contact pressure between the coupling and the pipe sections, said intermediate section having sufficient cross sectional area to absorb axial and bending stresses.

* * * * *

UNITED STATES PATENT AND TRADEMARK OFFICE
CERTIFICATE OF CORRECTION

PATENT NO. : 5,015,017
DATED : May 14, 1991
INVENTOR(S) : George B. Geary

It is certified that error appears in the above-identified patent and that said Letters Patent is hereby corrected as shown below:

On the cover page, line 11 of the Abstract, delete "pootential" and insert --potential--.

Column 6, line 22, insert --an-- before "unthreaded".

Column 6, line 32, delete "repeatedly" and insert --repeatably--.

Signed and Sealed this

Twenty-third Day of February, 1993

Attest:

STEPHEN G. KUNIN

*Attesting Officer*     *Acting Commissioner of Patents and Trademarks*